United States Patent
Fiekens et al.

(10) Patent No.: US 11,225,410 B2
(45) Date of Patent: Jan. 18, 2022

(54) METHOD FOR CONTROLLING AN OZONE GENERATOR

(71) Applicant: Xylem Europe GmbH, Schaffhausen (CH)

(72) Inventors: Ralf Fiekens, Schlossholte-Stukenbrock (DE); Reiner Fietzek, Herford (DE); Manfred Salvermoser, Herford (DE); Nicole Brüggemann, Lage (DE)

(73) Assignee: Xylem Europe GmbH

( * ) Notice: Subject to any disclaimer, the term of this patent is extended or adjusted under 35 U.S.C. 154(b) by 122 days.

(21) Appl. No.: 16/462,642

(22) PCT Filed: Oct. 13, 2017

(86) PCT No.: PCT/EP2017/076243
§ 371 (c)(1),
(2) Date: May 21, 2019

(87) PCT Pub. No.: WO2018/103927
PCT Pub. Date: Jun. 14, 2018

(65) Prior Publication Data
US 2020/0062592 A1    Feb. 27, 2020

(30) Foreign Application Priority Data
Dec. 7, 2016 (EP) .................. 16202684

(51) Int. Cl.
*C01B 13/11*    (2006.01)
(52) U.S. Cl.
CPC .......... *C01B 13/11* (2013.01); *C01B 2201/12* (2013.01); *C01B 2201/22* (2013.01); *C01B 2201/64* (2013.01); *C01B 2201/90* (2013.01)
(58) Field of Classification Search
CPC . C01B 13/11; C01B 2201/12; C01B 2201/22; C01B 2201/64; C01B 2201/90;
(Continued)

(56) References Cited

U.S. PATENT DOCUMENTS

| | | |
|---|---|---|
| 5,868,999 A | 2/1999 | Karlson |
| 8,728,402 B2 | 5/2014 | Vezzu |

(Continued)

FOREIGN PATENT DOCUMENTS

| | | |
|---|---|---|
| DE | 102011008947 A1 | 7/2012 |
| WO | 9007466 A1 | 7/1990 |
| WO | 2007014473 A1 | 2/2007 |

OTHER PUBLICATIONS

International Search Report and Written Opinion for International Application No. PCT/EP2017/076243, dated Jan. 19, 2018, 8 pages.

(Continued)

*Primary Examiner* — Xiuyu Tai
(74) *Attorney, Agent, or Firm* — RatnerPrestia

(57) ABSTRACT

A method for controlling an ozone generator with a high-voltage electrode, at least one counter electrode, and a gap in which at least one dielectric is arranged and which is perfused by an oxygen-containing gas having a particle density $n_{gas}$. The high-voltage electrode and the at least one counter electrode are provided with a connection for an electrical voltage supply for generating silent discharges in at least one discharge gap. Striking distances d of the discharge are distributed between a minimum striking distance $d_{min}$ and a maximum striking distance $d_{max}$. For the generation of an ozone concentration >12 wt. % ozone, the voltage amplitude $U_0$ of an AC voltage on the electrical voltage supply is selected so that $U_0 < 130*10^{-21}$ $V*m^2*n_{gas}*d_{max}*(C_{DL}+C_g)/C_{DL}$, with $C_{DL}$=capacitance of the dielectric and $C_g$=capacitance of the discharge gap.

18 Claims, 2 Drawing Sheets

(58) Field of Classification Search
CPC .. C01B 13/115; C01B 2201/76; B01J 19/088; B01J 19/08; B01J 4/008
See application file for complete search history.

(56) References Cited

U.S. PATENT DOCUMENTS

| | | | |
|---|---|---|---|
| 8,808,634 B2 | 8/2014 | Fietzek et al. | |
| 2002/0001550 A1* | 1/2002 | Shinjo | C01B 13/11 422/186.07 |
| 2013/0270103 A1* | 10/2013 | Shao | C01B 13/11 204/176 |
| 2013/0313106 A1* | 11/2013 | Nakatani | C01B 13/11 204/176 |
| 2016/0250614 A1* | 9/2016 | Tremblay | B01J 19/088 204/157.5 |

OTHER PUBLICATIONS

English translation of the Written Opinion for International Application No. PCT/EP2017/076243, dated Jan. 19, 2018, 5 pages.

\* cited by examiner

METHOD FOR CONTROLLING AN OZONE GENERATOR

CROSS-REFERENCE TO RELATED APPLICATIONS

This patent application is a U.S. National Phase Patent Application of PCT Application No.: PCT/EP2017/076243, filed Oct. 13, 2017, which claims priority to European Patent Application No. 16202684.3, filed Dec. 7, 2016, each of which is incorporated by reference herein in its entirety.

FIELD OF THE INVENTION

The present invention relates to a method for controlling an ozone generator.

BACKGROUND OF THE INVENTION

Ozone is a strong oxidising agent. Pollutants and dyes, taste and odour-affecting substances and microorganisms are destroyed by ozone through oxidation. Ozone is therefore used in a wide variety of application areas, for example in drinking water treatment, wastewater treatment, paper bleaching, air pollution control or even for the treatment of contaminated soils.

Ozonisers are known from the prior art. Such ozonisers comprise a plurality of ozone generators, which are arranged parallel to each other between two tube plates in the manner of a shell and tube heat exchanger. Ozone generators conventionally have an outer electrode and at least one inner electrode, which in operation are subjected to a high voltage, which causes a silent discharge in the gaps.

Depending on the area of application, a high or low ozone concentration may be desired. High ozone concentrations (>12 wt. %) are most economically produced by what are known as narrow-gap ozone generators with a gap width of less than 1 mm, while lower ozone concentrations (<12 wt. %) are produced with electrodes, with the gap widths starting at one millimetre respectively. A diagram of the efficiency of ozone generation as a function of the gap width for air and oxygen with different ozone content is known, for example, from WO 2007/014473 A1.

The adaptation of the gap width is conventionally solved mechanically, as for example in WO 2007/014473 A1, and can be achieved only by replacing the inner electrode, with necessary adjustments to different operating conditions.

The replacement of the electrode and the production or storage of the different variants of inner electrodes are costly.

SUMMARY OF THE INVENTION

An object of the present invention is to provide a method for controlling an ozone generator, in which the effective gap width can be adjusted individually without replacement of the electrode arrangement, so that even high ozone concentrations can be effectively produced.

This object is achieved by a method for controlling an ozone generator with a high-voltage electrode (5) and at least one counter electrode (1), wherein the high-voltage electrode (5) and the at least one counter electrode (1) delimit a gap in which at least one dielectric is arranged and which is perfused by an oxygen-containing gas having a particle density $n_{gas}$, and wherein the high-voltage electrode (5) and the at least one counter electrode (1) are provided with a connection for an electrical voltage supply (7) for generating silent discharges in at least one discharge gap, and wherein striking distances d of the discharge are distributed between a minimum striking distance $d_{min}$ and a maximum striking distance $d_{max}$, characterised in that for generating an ozone concentration>12 wt. % ozone, the voltage amplitude $U_0$ of an AC voltage on the electrical voltage supply (7) is selected such that $U_0 < 130 * 10^{-21}$ $V*m^2*n_{gas}*d_{max}*(C_{DL}+C_g)/C_{DL}$, with the particle density $n_{gas}$, the largest striking distance $d_{max}$, the capacity of the dielectric $C_{DL}$ and the capacity of the discharge gap $C_g$.

Thereafter, a method for controlling an ozone generator with a high-voltage electrode and at least one counter electrode is provided, wherein the high-voltage electrode and the at least one counter electrode define a gap in which at least one dielectric is arranged and which is traversed by an oxygen-containing gas having a particle density $n_{gas}$ [1/m³], and wherein the high-voltage electrode and the at least one counter electrode are provided with a connection for an electrical power supply for generating silent discharges in at least one discharge gap, and wherein striking distances d of the discharge are distributed between a minimum striking distance $d_{min}$ and a maximum striking distance $d_{max}$, and wherein for the generation of an ozone concentration>12 wt. % ozone, the voltage amplitude $U_0$ of an AC voltage on the electrical voltage supply is selected so that $U_0 < 130 * 10^{-21}$ $V*m^2*n_{gas}*d_{max}*(C_{DL}+C_g)/C_{DL}$, with the voltage amplitude $U_0$, the factor $130*10^{-21}$, which represents the reduced electric field strength (quotient of electric field strength and particle density) and the unit $V*m^2$ (volt*meter²), also known as CGS unit Townsend (Td), with the particle density $n_{gas}$[1/m³], the largest striking distance $d_{max}$ [m] and with $C_{DL}$=capacitance of the dielectric and $C_g$=capacitance of the discharge gap.

The term "method for controlling" is understood to mean that the corresponding control method is used in the continuous operation of the ozoniser, which can last from several minutes to continuous operation over several days or weeks. Transient processes are not claimed. In these processes, the ozone generator is subjected to the aforementioned voltage $U_0$ for a short time only, as may be the case, for example, with switching-on and switch-off processes in conventional control methods.

Depending on the power, feed gas and volume flow of the gas, an ozone generator operated according to this control method can also be operated in such a way that less than 12 wt. % of ozone is produced. However, this is not the subject-matter of the invention and is not claimed.

The ozone generator is operated with the aim of generating a certain ozone concentration. This ozone concentration will be predetermined by the system. Depending on the ozone concentration to be generated, the effective gap width or striking distance is selected by selecting the voltage amplitude. This selection is based on the known characteristics which indicate the efficiency of ozone generation as a function of the gap width for air and oxygen with different ozone content. Thus, depending on the voltage amplitude at a given ozone content, the efficiency of ozone generation can be increased. By varying the particle density and the frequency of the voltage, the amount of ozone generated per hour can be set. The method according to the invention makes it possible to adjust the effective gap width of the ozone generator without replacing the electrode arrangement, so that it is operated particularly effectively even when high concentrations of ozone are to be generated.

It may be advantageous that $U_0 < 120 * 10^{-21}$ $V*m^2*n_{gas}*d_{max}*(C_{DL}+C_g)/C_{DL}$. Furthermore, it can be provided that the voltage amplitude may be set such that $U_0 < 110 \cdot 10^{-21}$ $V \cdot m^2 \cdot n_{gas} \cdot d_{max} \cdot (C_{DL}+C_g)/C_{DL}$ or else that $U_0 < 100 \cdot 10^{-21}$ $V \cdot m^2 \cdot n_{gas} \cdot d_{max} \cdot (C_{DL}+C_g)/C_{DL}$. The higher the ozone concentration to be generated, the lower the voltage amplitude to be selected, which means that the ignited striking distance becomes increasingly smaller and thus an effectively smaller gap width is established.

In this case, it is advantageous for the generation of an ozone concentration>18 wt. % ozone if the voltage amplitude $U_0$ is selected such that $U_0 < 100 \cdot 10^{-21}$ $V \cdot m^2 \cdot n_{gas} \cdot d_{max} \cdot (C_{DL}+C_g)/C_{DL}$. It can also be provided that $U_0 < 90 \cdot 10^{-21}$ $V \cdot m^2 \cdot n_{gas} \cdot d_{max} \cdot (C_{DL}+C_g)/C_{DL}$.

In one embodiment, the high-voltage electrode is profiled. Preferably, the distribution of striking distances is formed by a wire fabric. In this case, the wire fabric can act as an electrode or surround the actual electrode. It is envisaged that the profiling is distributed continuously and periodically or stochastically. In contrast to electrodes stepped in the longitudinal direction, the pattern of the profiling repeats periodically or the striking distances of the profiling are stochastically distributed over the electrode. The periodic or stochastic distribution also applies to the case in which the dielectric has profiling and the electrodes are smooth.

In a preferred embodiment, the ozone generator has a single counter electrode and the dielectric is arranged in contact with the counter electrode. This is known as a one-gap system. The striking distance is defined as the distance between the dielectric and the high-voltage electrode. Preferably, the inner diameter of the high-voltage electrode is constant over the length of the electrode arrangement. As a result, the production of the electrode is significantly simplified.

In two preferred embodiments, the at least one counter electrode and the high-voltage electrode form a plate ozoniser or a tube ozoniser in which the at least one counter electrode and the high-voltage electrode are tubular and concentric to one another, and the fabric is a round hollow cord. In this case, plate ozonisers are preferably used for small ozonisers, which are mostly air-cooled. On the other hand, tube ozonisers are preferably used in large ozonisers which have a plurality of ozone generators and are largely cooled with water.

BRIEF DESCRIPTION OF THE DRAWINGS

A preferred embodiment of the invention is described below in more detail with reference to the drawings. In the drawings.

DETAILED DESCRIPTION OF THE DRAWINGS

Figure 1:
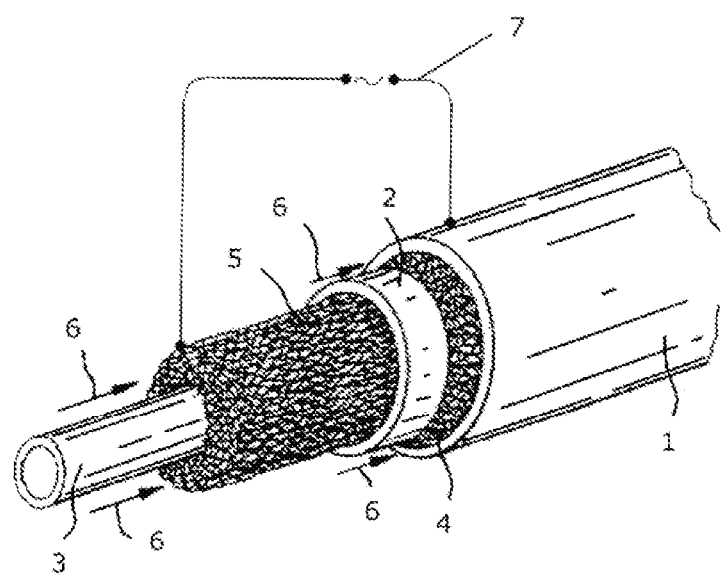
FIG. 1: shows a perspective view of an electrode arrangement from the prior art.

FIG. 1 shows an electrode arrangement of an ozone generator as known from DE 10 2011 008 947 A1. Ozone generators of this type are grouped and used in an ozoniser. The ozone generators are arranged parallel to each other between two tube plates in the manner of a shell and tube heat exchanger and electrically connected in parallel. The ozone generator shown has a tubular outer electrode 1, a likewise tubular dielectric 2 and an inner rod 3, wherein shortened versions of the individual components are shown spatially separated in an axial direction. The arrangement is rotationally symmetrical. The outer electrode 1, the dielectric 2 and the rod 3 are oriented concentrically to one another. There is a wire mesh 4 between the outer electrode 1 and the dielectric 2 that fills the gap. Accordingly, a wire mesh 5 is provided between the dielectric 2 and the rod 3 which also fills the gap there. The outer electrode 1 is designed in the form of a stainless steel tube. The waste heat generated during the ozone generation is cooled by means of cooling water which is passed along the outer side of the outer electrode between the tube plates. The dielectric 2 is a glass tube. The wire meshes 4 and 5 are preferably manufactured as round hollow cords made of a stainless steel wire mesh. The rod 3 arranged in the centre of the electrode arrangement is an insulator, for example made of glass of another material compatible with oxygen and ozone. The rod 3 can be solid. In operation, the electrode arrangement is charged with an oxygen-containing feed gas which flows through the wire mesh 4 and 5 in the direction of the arrows 6. An electrical voltage supply 7 is schematically indicated, which is in contact with the outer electrode 1 on one side and with the mesh 5 on the other. The operating voltage supplied by the voltage supply 7 causes a silent electrical discharge in the space between the electrodes 1, 5 and the dielectric 2 which generates ozone from the oxygen flowing through the meshes 4 and 5 in the direction of the arrow 6.

In the illustrated design, the inner electrode is formed solely from the mesh 5, while the rod 3 performs a supporting function as an insulator, which ensures that the interior of the dielectric 2 is uniformly filled with the wire mesh 5. This shape of the electrode results in an overlapping of volume and surface charge.

Figure 2:
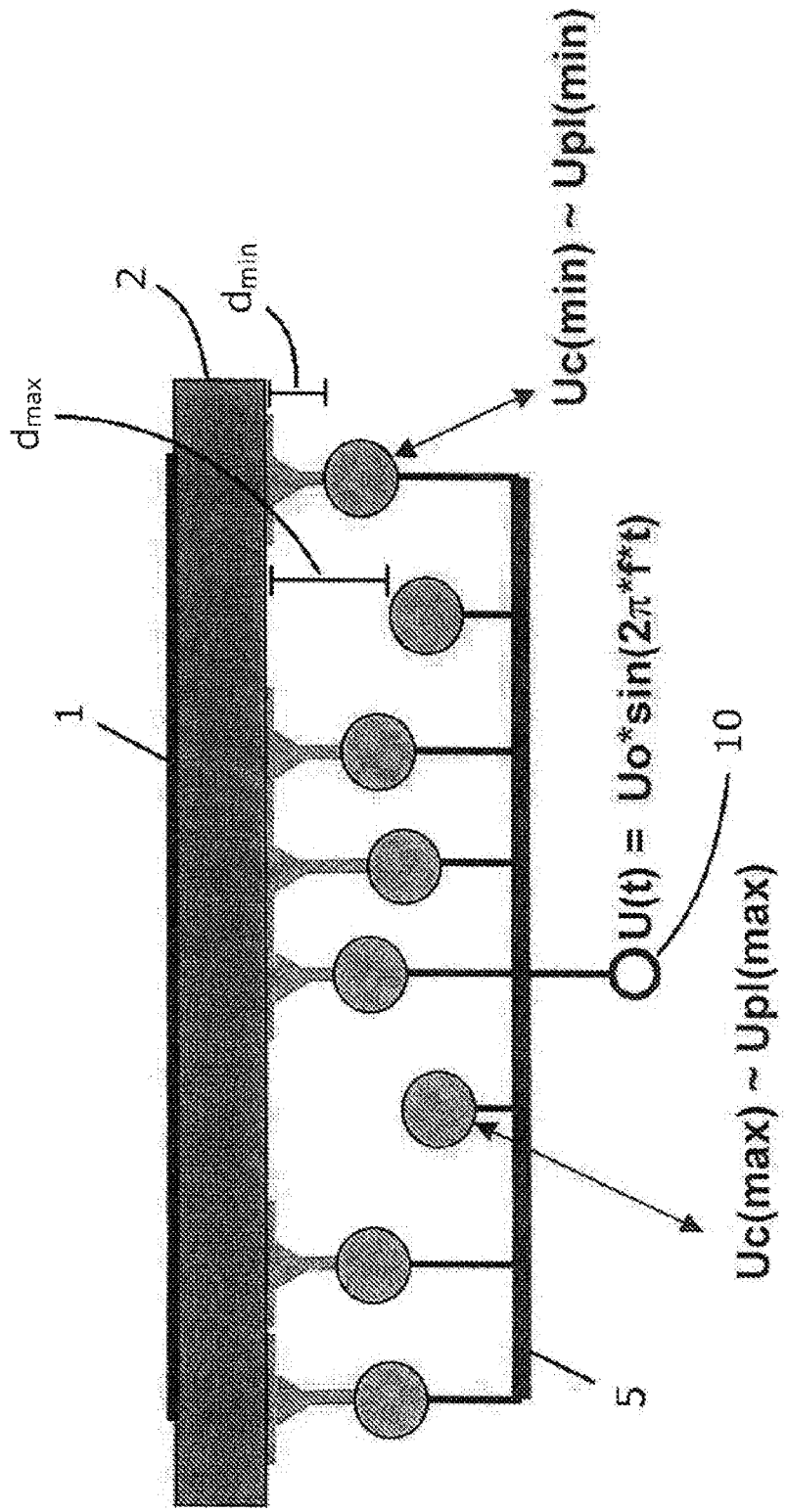
FIG. 2: shows a schematic representation of a discharge diagram of an ozone generator with variable gap width.

In contrast to ozone generators which have a defined gap width, the profiling of the high-voltage electrode 5 results in a plurality of possible gap widths and thus different impact widths d, which are shown schematically in FIG. 2 The gap width or the striking distance d is the distance between an electrode and the dielectric. Due to the different striking distances d in the range from $d_{min}$ to $d_{max}$, different starting voltages $U_C$, which lie between $U_C(d_{max})$ and $U_C(d_{min})$, also result. The striking distances d are in the order of μm-mm.

The electrical voltage supply 10 accordingly supplies the ozone generator with a sinusoidal voltage $U(t)=U_0 \cdot \sin(2\pi \cdot f \cdot t)$.

As the voltage amplitude $U_0$ increases, the discharge points, which are closer to the dielectric 2, are ignited first, while others are not yet ignited.

According to the invention, the voltage amplitude $U_0$ is selected as a function of the particle density $n_{gas}$ and the maximum size of the discharge gap $d_{max}$.

The applied voltage amplitude $U_0$ should be chosen to be so small that it is classified between $U_C(d_{min})$ and $U_C(d_{max})$, so that only a certain portion of the discharge points is available for discharge. This selection of discharge points produces an 'effective gap width', which is the average gap width of the ignited discharge points. This effective gap width is smaller in comparison to the gap width $d_{max}$ and thus advantageous for high ozone concentrations.

In order to be able to introduce the same electrical power into the discharge as in conventional operation at high voltage amplitudes, the frequency f can be adjusted during operation of the ozone generator. With the method according to the invention, this makes it possible to generate more ozone per gas volume used as compared with conventional operation, with the same electrical power being introduced.

$$d \cdot n_{gas} < 10^{22} \frac{1}{m^2}$$

should preferably apply to the statistical distribution of the impact distances d. This distribution can be realised, for example in the case of the electrode arrangement of FIG. 1, by means of a tight mesh.

The high-voltage electrode is an electrically conductive material, preferably stainless steel with a profiled surface. The high-voltage electrode can be a wire mesh or a knitted fabric, a fabric or even a wire winding or a granulate applied to a surface. Fibrous fabrics such as tiles or felts are equally suitable as structures which are applied to the electrode by mechanical processing or by coating. The profiling is stochastic or periodically distributed both in the longitudinal and in the circumferential direction of the electrode.

However, it is also conceivable to profile the dielectric instead of the electrode, whereby the same effect can be achieved.

The method according to the invention is not limited to tubular electrode arrangements. It can be used with both tube and plate ozonisers. The application is intended for single-gap as well as multi-gap systems. The electrically conductive material of the electrode can be introduced into the discharge space with or without carrier material.

The method of ozone generation according to the invention can of course also be used more generally in plasma generators.

The striking distances of the ozone generator can be adjusted by controlling the ozone generator by means of a variation of the applied voltage according to the invention. As already described, narrow gap systems are preferred for the efficient ozone generation of high ozone concentrations, whereas larger gap widths are advantageous for lower ozone concentrations. With the method according to the invention, the requirements for ozone generation can be realised solely by variation of the applied voltage.

The ozone generator can be adapted to customer-specific requirements by means of the method according to the invention. This is ecologically beneficial, and also economically advantageous in light of increasing energy prices. By adjusting the gap width, higher ozone concentrations (>15 wt. %) can be efficiently generated. The use of high ozone concentrations for water treatment improves the entry efficiency of ozone into water.

By improving efficiency, especially at high ozone concentrations, ozonisers can be made significantly smaller. Another advantage of the method according to the invention is that the costly production of flat or cylindrical smooth electrode surfaces is eliminated.

In addition, ozone generation is possible at higher cooling water temperatures, which can reduce the cost of cooling the ozone generator. The significantly low temperature susceptibility of the electrode allows the use of larger temperature differences between the cooling water inlet and the cooling water outlet, which reduces the need for cooling water.

By operating the ozone generator at low voltages, the transformer or inverter can be made smaller. In addition, operating the ozone generator at higher frequencies reduces noise emissions.

The invention claimed is:

1. A method for controlling an ozone generator with a high-voltage electrode and at least one counter electrode, wherein the high-voltage electrode and the at least one counter electrode delimit a gap in which at least one dielectric is arranged and which is perfused by an oxygen-containing gas having a particle density $n_{gas}$, and wherein the high-voltage electrode and the at least one counter electrode include a connection for an electrical voltage supply for generating silent discharges in at least one discharge gap, and wherein striking distances d of the discharge are distributed between a minimum striking distance $d_{min}$ and a maximum striking distance $d_{max}$, said method comprising the steps of:

(a) generating an ozone concentration having greater than 12 weight % ozone in the oxygen-containing gas using a voltage amplitude $U_0$ of an AC voltage on the electrical voltage supply such that for the particle density $n_{gas}$, a capacitance of the dielectric $C_{DL}$ and a capacitance of the discharge gap $C_g$, wherein V*m² denotes units expressed in volt*meter²:

$$U_0 < 130 * 10^{-21} V * m^2 * n_{gas} * d_{max} * (C_{DL} + C_g)/C_{DL}$$

and, (b) controlling the ozone generator to achieve a first ozone concentration by using a first voltage amplitude, and to achieve a second ozone concentration by using a second voltage amplitude, the second ozone concentration higher than the first ozone concentration, and the second voltage amplitude lower than the first voltage amplitude.

2. The method according to claim 1, wherein:

$$U_0 < 120 * 10^{-21} V * m^2 * n_{gas} * d_{max} * (C_{DL} + C_g)/C_{DL}.$$

3. The method according to claim 1, wherein:

$$U_0 < 110 * 10^{-21} V * m^2 * n_{gas} * d_{max} * (C_{DL} + C_g)/C_{DL}.$$

4. The method according to claim 1, wherein:

$$U_0 < 100 * 10^{-21} V * m^2 * n_{gas} * d_{max} * (C_{DL} + C_g)/C_{DL}.$$

5. The method according to claim 1, wherein for the ozone concentration to be generated of greater than 18 wt. % ozone in the oxygen-containing gas, the voltage amplitude $U_0$ is selected so that:

$$U_0 < 100 * 10^{-21} V * m^2 * n_{gas} * d_{max} * (C_{DL} + C_g)/C_{DL}.$$

6. The method according to claim 1, wherein:

$$U_0 < 90 * 10^{-21} V * m^2 * n_{gas} * d_{max} * (C_{DL} + C_g)/C_{DL}.$$

7. The method according to claim 1, wherein the high-voltage electrode is a profiled electrode.

8. The method according to claim 1, wherein the striking distances $d_{min}$ to $d_{max}$ are distributed continuously and stochastically.

9. The method according to claim 1, wherein the ozone generator has a single counter electrode and the dielectric is arranged in contact with the counter electrode.

10. The method according to claim 1, wherein the high-voltage electrode and the at least one counter electrode are plates and form a plate ozone generator.

11. The method according to claim 1, further comprising generating more ozone gas per volume of the oxygen-containing gas at a same electrical power by varying a frequency of the voltage during operation of the ozone generator.

12. The method according to claim 1, further comprising regulating ozone generation rate by varying the particle density and a frequency of the voltage.

13. The method according to claim 1, wherein the striking distances $d_{min}$ to $d_{max}$ are distributed continuously and periodically.

14. The method according to claim 1, wherein the striking distances $d_{min}$ to $d_{max}$ are distributed in a longitudinal direction of the electrode.

15. The method according to claim 14, wherein the striking distances $d_{min}$ to $d_{max}$ are distributed in a circumferential direction of the electrode.

16. The method according to claim 1, wherein the striking distances $d_{min}$ to $d_{max}$ are distributed in a circumferential direction of the electrode.

17. A method for controlling an ozone generator with a high-voltage electrode and at least one counter electrode, wherein the high-voltage electrode and the at least one counter electrode delimit a gap in which at least one dielectric is arranged and which is perfused by an oxygen-containing gas having a particle density $n_{gas}$, and wherein the high-voltage electrode and the at least one counter electrode include a connection for an electrical voltage supply for generating silent discharges in at least one discharge gap, and wherein striking distances d of the discharge are distributed in a distribution between a minimum striking distance $d_{min}$ and a maximum striking distance $d_{max}$, said method comprising the steps of:

(a) generating an ozone concentration having greater than 12 weight % ozone in the oxygen-containing gas using a voltage amplitude $U_0$ of an AC voltage on the electrical voltage supply such that for the particle density $n_{gas}$, a capacitance of the dielectric $C_{DL}$ and a capacitance of the discharge gap $C_g$, wherein V*m² denotes units expressed in volt*meter²:

$$U_0 < 130*10^{-21} V*m^2 * n_{gas} * d_{max} * (C_{DL}+C_g)/C_{DL}$$

wherein the distribution of the striking distances from $d_{min}$ to $d_{max}$ is formed by a fabric made of wire.

18. The method according to claim 17, wherein the at least one counter electrode and the high-voltage electrode are tubular and concentrically aligned with each other, and the fabric is a round hollow cord.

* * * * *